March 31, 1936.  H. E. WARREN  2,036,003
TEMPERATURE CONTROL OF MOTORS
Filed Aug. 22, 1934
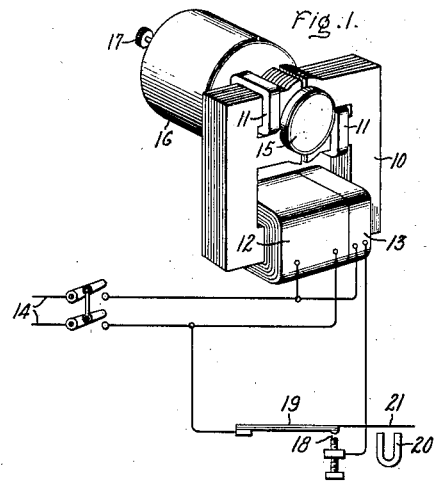
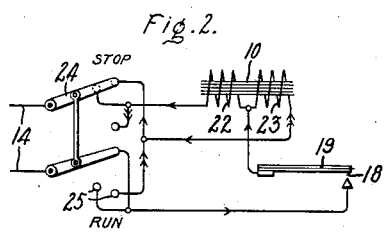
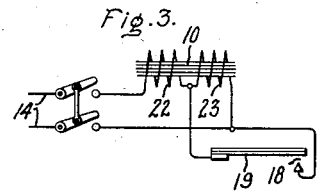
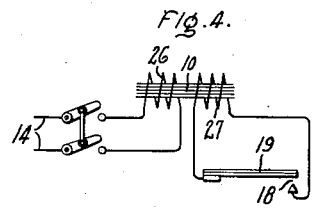
Inventor:
Henry E. Warren,
by Harry E. Dunham
His Attorney.

Patented Mar. 31, 1936

2,036,003

UNITED STATES PATENT OFFICE 2,036,003

TEMPERATURE CONTROL OF MOTORS

Henry E. Warren, Ashland, Mass., assignor to Warren Telechron Company, Ashland, Mass., a corporation of Maine Application August 22, 1934, Serial No. 740,963

9 Claims. (Cl. 172—274)

My invention relates to the temperature control of small motors and its primary object is to provide means for preventing failure of the motor due to extremely cold ambient temperature conditions.

In the form of motor drive described in my United States Patent No. 1,495,936, May 27, 1924, the motor assembly includes a gear reduction unit enclosed in a lubricating chamber. Such self-starting synchronous motors are used extensively for driving clocks, time switches, recording charts, and the like, and in practice, are often used in localities and under conditions where the temperature varies considerably. Changes in temperature vary the viscosity of the lubricating oil in the gear chamber and, if the proper grade of oil is used for normal temperature, down to about zero degrees Fahrenheit, for example, the oil is likely to become sufficiently thick and stiff below such temperature as to cause failure of the motor. The present invention is intended primarily for use with such motors which are likely to be subjected to ambient temperatures below which there is a probability of failure due to stiffening of the lubricating oil used.

In carrying my invention into effect, I make use of the motor energizing winding to supply the extra heating which is necessary for excessively cold temperatures and use temperature control means, such as a thermostat, for varying the winding connections in response to temperature changes as required. This is accomplished without interfering with the proper energization of the motor as required for operation under either condition.

The features of my invention which are believed to be novel and patentable will be pointed out in the claims appended hereto. For a better understanding of my invention, reference is made in the following description to the accompanying drawing showing various modifications of the invention and in which Fig. 1 represents a complete motor together with thermostat control for connecting an additional winding section in parallel with the normally energized winding section when the ambient temperature drops below a predetermined value. In Figs. 2, 3 and 4, only the motor windings and connections are represented. In Fig. 2 is represented a thermostat control scheme and motor connections arranged to maintain the motor at the proper operating temperature when the motor is not operating as well as when in operation. Here the thermostat is arranged to short-circuit a portion of the motor winding when the motor is in normal operation and to energize two winding sections of the motor field in opposition when the motor is not in operation in response to low temperatures. Fig. 3 is a simplified diagram of the motor operating connections of Fig. 2. In Fig. 4, the motor field is provided with separate winding sections arranged in transformer relation with temperature control means for short-circuiting the transformer secondary winding in response to low temperatures.

Referring now to Fig. 1, I have here represented in outline the form of motor described in my patent previously referred to as representing a type of motor to which the present invention may be applied to advantage when the motor is likely to be exposed to very cold temperatures, but I of course do not wish to limit my invention to any particular type of motor. The motor stator comprises a magnetic field structure 10 having two pole pieces provided with shading coils 11 and having a single-phase energizing winding which is here divided into two sections 12 and 13. It will be understood that, when the winding is suitably energized by alternating current from the source indicated at 14, an alternating flux is produced between the pole pieces and this flux is given a rotating component by the shading coils 11. This flux acts upon a suitable motor rotor contained within the reduced portion 15 of a gear casing 16. The rotor is thus caused to rotate and its movement is conveyed to a terminal pinion 17 thru suitable reduction gearing contained within the chamber 16. As more fully described in my Patent No. 1,495,936, the gear casing contains a certain amount of oil for lubricating the various bearings of this motor drive. Should the motor be exposed to excessively cold temperatures, this oil is likely to stiffen and become sufficiently non-viscous to produce a failure in the proper operation of the motor. This failure may consist in a reduction in speed below synchronism where a synchronous speed is desired or it may consist in a complete stopping of the motor while in operation or in a failure of the motor to start promptly when energized for that purpose.

To guard against such failures I have provided means to increase the motor excitation when the ambient temperature drops below a safe operating value. The winding section or coil 12 is connected across the source of supply 14 when the line switch is closed for normal motor operation and winding section 12 is suitably proportioned to furnish the required amount of excitation for the motor under normal temperature conditions. Winding section or coil 13 is connected across the source of supply through contacts 18 controlled by a thermostat or other temperature control device 19 which contacts are open under normal temperature conditions.

The thermostat may consist of a bimetallic member which bends to close the contacts as the temperature decreases to zero degrees Fahrenheit, for example. It is preferably located a sufficient distance away from or below the motor so as to respond to ambient temperature and not the change in temperature of the motor itself. This arrangement tends to prevent hunting and frequent interruption of the thermostat contacts. If a quick make and break of the contacts are desirable for any reason I may provide the thermostat with a small permanent magnet 20 and a magnetic armature part 21 which is attracted by the magnet when the thermostat approaches the contact closing position. The influence of the permanent magnet 20 and armature 21 is made sufficient only to modify the action of the thermostat to quickly open and close the contacts in response to temperature changes.

When the ambient temperature drops below a certain value for which the thermostat is adjusted, coil 13 is thus connected in parallel with coil 12 in such manner as to increase the excitation of the motor by any desired amount depending upon the relation of the ampere turns in the two coils, and when the ambient temperature again increases, the contacts at 18 open to cut out coil 13.

It is, of course, obvious that coil 12 alone produces a certain amount of heating of the motor due to the resistance loss in the coil itself and the iron losses in the magnetic circuit of the motor. Energization of coil 13 not only increases this motor heating but also increases the torque of the motor. The motor, as thus controlled, has a greater torque under excessively cold ambient temperatures than when this temperature is normal. The increased motor heating and increased motor torque at low ambient temperatures together prevent motor failures due to low ambient temperatures. The increased heating of the motor structure which is in direct contact with the gear casing, tends to offset a drop in ambient temperature in maintaining the lubricating oil in a proper lubricating condition while the increase in motor torque tends to offset the increase in friction due to a lowering of the viscosity of the lubricating oil with temperature.

The arrangement of Fig. 1 is suitable where the motor is intended to be in continuous operation as, for example, where it drives an ordinary time clock. In some applications as for example, certain time switch applications, the motor is stopped part of the time. In such applications, where the motor is likely to be exposed to abnormally cold temperatures, it is desirable to modify the invention so as to maintain the motor in an operating temperature condition while stopped as well as when in normal operation, as otherwise the motor might fail to start promptly or to reach a synchronous operating speed quickly when an attempt is made to start it after it has been idle for sometime, although it will be recognized that as soon as the motor of Fig. 1 is energized, its heating arrangement will soon raise the temperature of the motor to an operating value.

The arrangement of Fig. 2 is suitable for motors which are stationary part of the time and where quick starting is essential.

In Fig. 2, 10 represents the stator core structure of the motor and 22 and 23 sections of the energizing winding. The line switch 24 between the source of supply 14 and the motor has positions marked "Stop" and "Run" and in either position heat energy may be supplied to the motor winding as required in response to ambient temperature conditions through the control of the thermostat 19 and its contacts 18.

When the switch 24 is in the "Stop" position shown with the thermostat contacts 18 open, no motor winding section is energized. Should the ambient temperature now drop to a low value, thermostat 19 will bend and close the contacts at 18 and current will flow through the motor winding sections 22 and 23 in parallel but in opposition as indicated by the single headed arrow indications. The motor will not start because with the coils in opposition, little if any flux is produced in the stator field structure, but nevertheless an appreciable amount of heat is released due to the resistance of the winding sections, which is conveyed through the core structure directly to the gear casing which is in contact with the core structure as represented in Fig 1. If the ampere turns of the two sections are made equal, the reactance effect is zero and the current is limited only by the resistance of the windings so that ample heating may be had. The winding sections can of course be made unequal by any amount below that which results in producing a flux sufficient to start the motor. In this way the motor may be kept sufficiently warm while at rest to permit instantaneous starting when energized for the latter purpose which is accomplished by throwing switch 24 to the "Run" position. If it is desired to cut off motor heating entirely at standstill the switch 24 may be moved to a position between the start and run positions.

When connected for "Run" with the thermostat contacts 18 open, winding sections 22 and 23 will be energized in series as represented by the double headed arrow indications. The two winding sections will then assist each other in producing motor operating flux of normal value. If during such normal operation the ambient temperature drops below a safe operating value, the contacts at 18, will be closed and winding section 23 will be short-circuited through the lower switch contacts 25. As is well known, this will increase the current in winding section 22 and winding section 23 becomes in effect a short-circuited secondary of a transformer. The heating effect is considerably increased without impairing the motor operating flux and torque. A simplified diagram for the motor operating connections of Fig. 2 is shown in Fig. 3 and this simplified arrangement can, of course, be used for a motor which is intended to operate continuously. The relative reactance and resistance of the two winding sections can be varied to obtain the best overall results.

Fig. 4 represents another arrangement of the invention for a continuously operating motor. In this example, the motor has only one energizing winding 26 which is energized whenever it is desired to operate the motor. On the core 10 is wound another coil 27 in transformer relation with coil 26 and the circuit of this transformer secondary is controlled by the thermostat 19 and its contacts 18 in response to ambient temperature changes. Under conditions of cold ambient temperatures, the contacts at 18 are closed allowing a short-circuit current to flow in the secondary coil 27 which supplies resistance loss heating. This correspondingly increases the primary current and the resistance loss heating produced thereby is also increased. This arrangement maybe be used where it is desirable to keep the line voltage of the power circuit away from the thermostat circuit. The motor operating flux and torque is not increased by this transformer arrangement and, in fact, may be diminished slightly, but this is not serious as the motor can have and usually does have a large margin of extra power provided the temperature does not go too low, which is prevented by the direct contact electrical resistance heater incorporated in the motor windings.

It will be evident that the heating arrangements described are highly efficient as the heat is applied directly to the motor to be kept warm and that they do not require a rise in temperature of the air surrounding the motor itself. Other modifications of the invention will occur to those skilled in the art and such other modifications as fall within the true spirit and scope of my invention are intended to be covered by the broader claims appended hereto.

What I claim as new and desire to secure by Letters Patent of the United States is:

1. An electric motor having a field core structure, and winding means thereon for producing motor-operating flux in the core structure, circuit connections for supplying electric energy to said winding means, and circuit-control means operating in response to ambient temperature changes to increase the amount of electric energy supplied to said winding means from a value sufficient to operate the motor under normal ambient temperature conditions to a greater value when the ambient temperature decreases below a predetermined value.

2. An electric motor having energizing winding means thereon to supply the normal operating energy of the motor and to supply additional energy primarily for heating the motor, and circuit-control means responsive to ambient temperature changes for controlling the supply to said winding means of the energy for heating the motor without interfering with the supply of energy thereto for normal operation.

3. An electric motor having energizing winding means thereon to supply the normal operating energy of the motor and to supply energy for heating the motor, circuit-control means responsive to ambient temperature changes for controlling the supply to said winding means of the energy for heating the motor without interfering with the supply of the energy thereto for normal operation, and a line switch through which all such energy to the motor is supplied having "Stop" and "Run" positions and having connections to supply heat energy to the motor, subject to the control of the ambient temperature responsive means, in either of said positions.

4. An electric motor having a magnetic field structure with a winding part for supplying the normal operating energy of said motor and a winding part primarily for supplying heat energy to said motor when the first mentioned winding part is energized without interfering with normal motor operation, a switch in the circuit of said second mentioned winding part, means responsive to ambient temperature below a predetermined value for closing said switch, and a common source of supply for said winding parts.

5. An electric motor having two energizing windings, a common source of supply for said windings, connections for supplying said windings in parallel from said source so as to produce similar torque-producing fluxes in said motor, and means responsive to ambient temperature changes for opening and closing the circuit of one of said windings respectively as the ambient temperature rises above and falls below a predetermined value, the other winding supplying said motor with ample operating energy for ambient temperatures above said predetermined value.

6. An electric motor having a pair of energizing windings, an alternating-current source of supply, connections for supplying said windings in series from said source, and means responsive to ambient temperature changes for opening and closing a short circuit across one of said coils respectively as the ambient temperature rises above and falls below a predetermined value.

7. An alternating-current motor together with temperature-control means therefor comprising the main energizing winding for said motor, a normally open-circuited winding in transformer relation therewith, and means responsive to ambient temperatures for closing and opening the circuit of said second mentioned winding respectively as the ambient temperature falls below and rises above a predetermined value.

8. An electric motor and temperature control means therefor for maintaining the temperature of the motor above a value that would otherwise interfere with its proper operation under extremely cold ambient temperature conditions comprising winding means for supplying the operating flux of said motor together with temperature-control means responsive to ambient temperature changes for varying the amount of electric energy supplied to said motor through said winding means.

9. An electric motor device having bearings lubricated with oil, electric heating means for said device to prevent the temperature of the lubricating oil thereof from going below a satisfactory lubricating temperature when the device is subjected to a lower ambient temperature, said heating means including an energizing winding of the motor, and means responsive to ambient temperature variations for controlling the amount of electric energy supplied to such winding.

HENRY E. WARREN.